United States Patent [19]
Meyer

[11] 3,758,855
[45] Sept. 11, 1973

[54] RESISTANCE CONTROLLABLE INDICATOR

[75] Inventor: Richard R. Meyer, 1925A Stuart St. Berkeley, Calif. 94703

[22] Filed: July 9, 1970

[21] Appl. No.: 53,438

[52] U.S. Cl. .................. 324/65 R, 324/51, 331/65, 340/235, 340/384 E
[51] Int. Cl. .......................................... G01r 27/02
[58] Field of Search ................ 324/65, 51; 331/65, 331/111, 66; 340/235, 384 E

[56] References Cited
UNITED STATES PATENTS

| | | | |
|---|---|---|---|
| 2,582,629 | 1/1952 | Hilton | 324/65 P |
| 3,302,102 | 1/1967 | Lace | 324/65 P |
| 3,689,832 | 9/1972 | Leto et al. | 324/65 R |
| 2,988,708 | 6/1961 | Schmidt | 331/111 |
| 3,359,425 | 12/1967 | Smith | 331/111 X |
| 2,918,054 | 12/1959 | Goolkasian | 324/62 X |
| 3,245,068 | 4/1966 | Wegryn et al. | 340/235 |
| 3,412,326 | 11/1968 | Jones et al. | 324/65 |

OTHER PUBLICATIONS

G.E. Transistor Manual, Seventh Edition, (light-weight edition), 1964, pp. 4,5,24 and 25.

Primary Examiner—Stanley T. Krawczewicz
Attorney—Edward Brosler

[57] ABSTRACT

A resistance controllable indicator involving a frequency generating circuit wherein the frequency is a function of resistance, the circuit including a pair of spaced terminals normally defining infinite resistance between them and across which, the resistance may be altered on the occasion of and in response to certain phenomena to be indicated and which involve changes in electrical resistance conductivity. No on-off switch is necessary to preserve battery power during periods when not in use.

6 Claims, 3 Drawing Figures

PATENTED SEP 11 1973  3,758,855
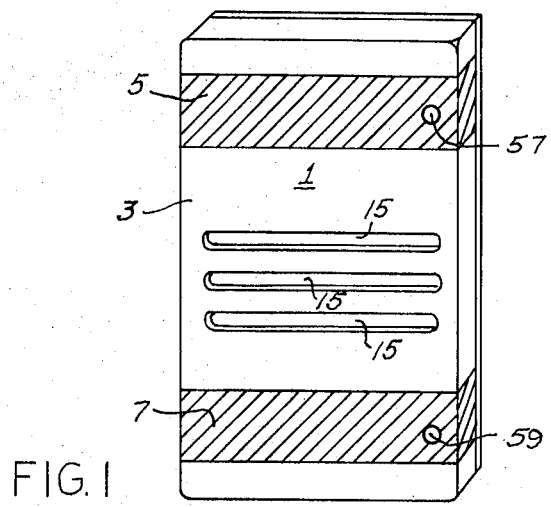
FIG. 1
FIG. 2
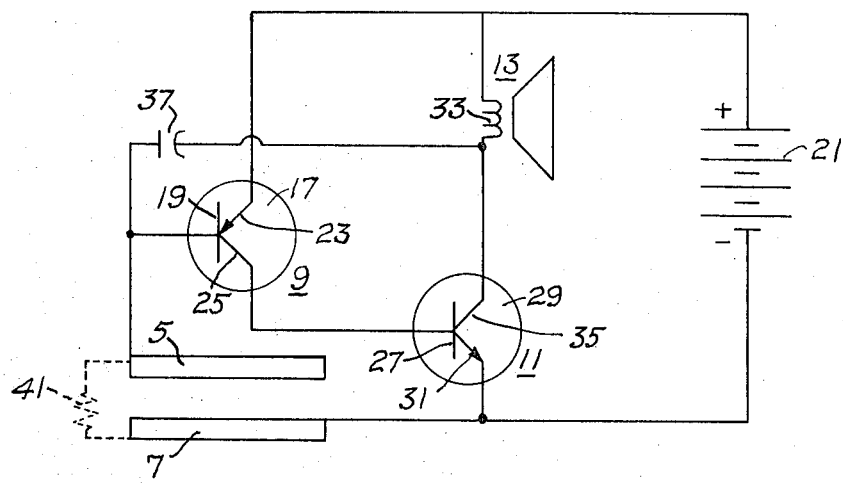
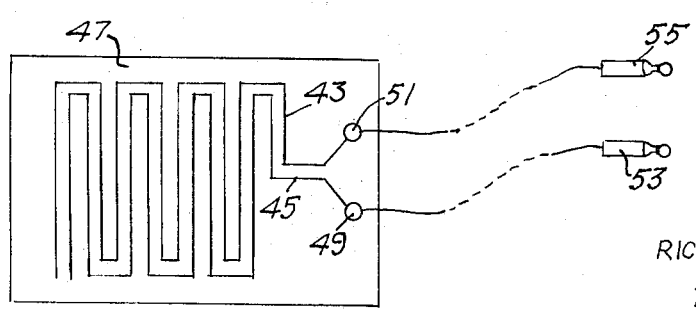
FIG 3
INVENTOR.
RICHARD R. MEYER
BY Edward Brosler
ATTORNEY

RESISTANCE CONTROLLABLE INDICATOR

My invention relates broadly to indicators and more particularly to one employing a frequency generating circuit controllable by changes in electrical resistance.

Among the objects of my invention are:
1. To provide a novel and improved indicator employing a frequency generating circuit that is controllable by change in electrical resistance;
2. To provide a novel and improved indicator of the aformentioned type wherein the change in electrical resistance may be the result of phenomena to be indicated;
3. To provide a novel and improved indicator employing a frequency generating circuit controllable by a change in electrical resistance, and powered by a battery, and which requires no on-off switch to preserve battery power;
4. To provide a novel and improved indicator employing a frequency generating circuit which is controllable by change in electrical resistance, and which is adaptable for a multitude of applications where changes in electrical resistance are apt to occur and where indications of such changes are desired;
5. To provide a novel and improved indicator employing a frequency generator circuit which is controllable by change in electrical resistance, and wherein printed circuits may be utilized.

Additional objects of my invention will be brought out in the following description of a preferred embodiment of the same, taken in conjunction with the accompnaying drawings wherein FIG. 1 is a view in perspective of an indicator incorporating the present invention;

FIG. 2 is a view depicting the circuitry employed in the device of FIG. 1, and one which is capable of being produced in printed circuit form;

FIG. 3 is a view depicting a form of terminal assembly for use in conjunction with and as a part of the device of FIG. 1.

Referring to the drawings for a description of my invention, I have depicted in FIG. 1, an indicator 1 in the form of a shallow case 3 of insulation material such as plastic, and having exposed spaced apart strip terminals 5 and 7 of conductive material extending across the face of the case and preferably embedded therein. If desired, such terminals may be extended across the side edges of the case or completed around the same.

Within the case is a circuit of the transistorized type such as shown in FIG. 2, which is capable of generating a frequency in accordance with a change in resistance.

The specific circuit illustrated involved two transistorized stages 9 and 11 energizing an indicating device, preferably one in the form of a loud speaker 13, and when the indicating device is a loud speaker, the case will be provided with the sound slots 15 in the face thereof.

The initial stage of the circuit comprises a transistor 17, preferably one of the PNP type having its base electrode 19 connected to one of the exposed strip terminals 5, the other strip terminal 7 being connected to the negative terminal of a battery 21 which is to power the circuit. The emitter electrode 23 of the first stage is directly connected to the positive terminal of the battery, while the collector electrode 25 connects to the base electrode 27 of the second stage transistor 29, which is of the NPN type.

The second stage out-put circuit includes a connection from the emitter electrode 31 of the second stage transistor, to the negative terminal of the battery, and a connection from the positive terminal of the battery through the coil 33 of the loud speaker, to the collector electrode 35 of this transistor.

Coupling the out-put of the second stage back into the in-put of the first stage is a reactance, in this case a capacitor 37, which conditions the circuit for operation at a frequency which will vary with change of resistance across the terminals 5 and 7 over a frequency range determined in part by the value of the capacitor, and in part by the range of effective resistance values to be applied across these terminals. Where the response is to be by way of a loud speaker, the values will be selected to provide frequency response within the audible range.

In the arrangement as described, essentially an open circuit exists between the strip terminals 5 and 7, and the electrical resistance between such terminals will accordingly, for practical purposes, be of infinite value when the indicator is not in use. The application of a lower order of resistance 41 across these terminals, will then produce a frequency response, and the frequency of such response will increase with decrease in such resistance.

The device thus lends itself to various applications, such as in the field of amusement, for example, where it may be employed for fun, as a kiss detector. In such application, each of the two individuals engaged in the game, contact a different one of the strip terminals and close the circuit by kissing, the frequency of the tone produced, varying with the intensity of the pressure of the lips involved. As a child's toy, it may be employed merely as a "buzz" box by a child contacting each electrode and varying the pressure of his hands thereon to alter the tone produced.

From the view point of a more technical application of the invention, the same may be employed in determining condensation of moisture on a surface, for example. For this purpose, it is preferred that a variation in the terminal structure be employed. Thus in place of the two terminal strips 5 and 7 previously described, I prefer to utilize parallel wires 43 and 45 arranged in zig zag formation, preferably printed on a base plate 47 and connected to terminals 49 and 51, which in turn may be electrically connected to plugs 53 and 55 respectively. By providing appropriate jacks 57 and 59 in the case of the device of FIG. 1, these wires may be plugged into the circuit, the resistance then being that between the wires. As moisture condenses onto the base plate, the resistance between wires drops in value and the frequency response of the device will increase with lowering of such resistance.

In lieu of the loud speaker as the indicating means of the invention, one might employ other suitable types of indicators such as a frequency meter, and from the few examples given for demonstrating the utility of the invention, it will be apparent that the same may be useful in many other applications where a phenomenon to be indicated, involves electrical resistance.

An important feature of the present invention lies in the fact that it can be made so that no on-off switch is required to disconnect the battery during non-use of the indicator, to minimize battery loss of power. I have found that this can be accomplished by utilizing silicon transistors in the described circuit, as distinguished from germanium type transistors, the advantage being attributable to the low leakage characteristic of silicon transistors.

It can be seen from an analysis of the circuit that there are only two possible paths for direct current drain from the battery. One of these extends from the positive terminal of the battery through the emitter 23 to collector 25 of the PNP transistor 17, in series with the base-emitter junction of the NPN transistor 29, and then to the negative terminal of the battery.

The other of the two possible leakage paths may be traced from the positive terminal of the battery through the coil 33 of the speaker, in series with the collector 35 to emitter 31 of the transistor 27 and thence to the negative terminal of the battery.

During non-use of the indicator, there can be no forward bias on the transistor 17 due to the practically infinite resistance between the terminals 5 and 7. In the absence of forward bias, no current will flow, and this coupled with the low leakage characteristic of a silicon transistor, will assure negligible drain on the battery during non-use periods through this possible leakage path.

As regards the second of the two possible leakage paths, no current will flow unless the transistor 29 is forward biased. Since forward bias on the transistor 29 is produced only as a result of collector current flow in the collector circuit of the transistor 17 and such current does not flow during non-use periods, it follows that no forward bias exists on the transistor 29 during such non-use periods. This, coupled with the low leakage characteristic of the silicon transistor, will assure negligible drain on the battery in this second possible leakage path.

Thus, in view of the negligible drain on the battery during non-use periods, the necessity of an on-off switch in the circuit is avoided.

While I have illustrated and described my invention in its preferred form, the same is subject to alteration and modification without departing from the underlying principles involved.

I claim:

1. A resistance controllable indicator comprising a transistorized frequency generating circuit whose frequency is determined by resistance and reactance, said frequency generating circuit including a transistor of the silicon type having base, emitter and collector electrodes and characterized by having low leakage, a power source and indicator, means connecting said emitter and collector electrodes in circuit with said power source and indicator, a second transistor and circuit in signal supply relationship to the base electrode of said first transistor, said second transistor being also of the silicon type having base, emitter and collector electrodes and characterized by low leakage, means for feeding back from said indicator circuit, to said second transistor, signal energy appearing in said indicator circuit, said second transistor circuit comprising a normally open circuit defined by a pair of spaced contacts determining substantially infinite resistance whereby to provide a standby condition with negligible battery drain and without the use of an on/off switch, and means for connecting a lower order of resistance across said spaced contacts to draw sufficient current to produce a response from said indicator in accordance with said lower order of resistance.

2. A resistance controllable indicator in accordance with claim 1, characterized by said feed back means comprising a capacitor in circuit between said indicator circuit and the base electrode of said second transistor, and further characterized by said second transistor circuit including said spaced contacts, being connected from one side of said power source to the base electrode of said second transistor.

3. A resistance controllable indicator in accordance with claim 2, characterized by a case enlosing said frequency generating circuit, with said spaced contacts mounted on the wall structure of said case to provide externally accessible terminals.

4. A resistance controllable indicator in accordance with claim 3, characterized by said externally accessible terminals being in the form of contact strips affixed to a wall of said case and exposed to manual contact.

5. A resistance controllable indicator in accordance with claim 2, characterized by said frequency indication means as including a speaker.

6. A resistance controllable device in accordance with claim 2, characterized by said practically infinite resistance comprising a base plate of insulation and a pair of wires arranged in spaced relationship to each other on said plate.

* * * * *